United States Patent
Chan et al.

(10) Patent No.: US 9,419,944 B2
(45) Date of Patent: Aug. 16, 2016

(54) METHODS AND SYSTEMS FOR ESTABLISHING VPN CONNECTIONS AT A VPN MANAGEMENT SERVER

(71) Applicant: Pismo Labs Technology Limited, Hong Kong (HK)

(72) Inventors: Ho Ming Chan, Hong Kong (HK); Chak Ming Lau, Hong Kong (HK)

(73) Assignee: PISMO LABS TECHNOLOGY LIMITED, Hong Kong (HK)

( * ) Notice: Subject to any disclaimer, the term of this patent is extended or adjusted under 35 U.S.C. 154(b) by 0 days.

(21) Appl. No.: 14/421,140

(22) PCT Filed: Nov. 6, 2014

(86) PCT No.: PCT/IB2014/065842
§ 371 (c)(1),
(2) Date: Feb. 11, 2015

(87) PCT Pub. No.: WO2016/071738
PCT Pub. Date: May 12, 2016

(65) Prior Publication Data
US 2016/0134590 A1    May 12, 2016

(51) Int. Cl.
*H04L 12/12* (2006.01)
*H04L 29/06* (2006.01)
*H04L 29/08* (2006.01)
*H04L 12/721* (2013.01)

(52) U.S. Cl.
CPC .......... *H04L 63/0272* (2013.01); *H04L 67/141* (2013.01)

(58) Field of Classification Search
CPC ................ H04L 2012/5621; H04L 12/4641
See application file for complete search history.

(56) References Cited

U.S. PATENT DOCUMENTS

| | | | | |
|---|---|---|---|---|
| 7,590,074 B1* | 9/2009 | Dondeti | ........ | H04L 12/4675 370/254 |
| 7,689,722 B1* | 3/2010 | Timms | ........ | H04L 12/4641 709/203 |
| 7,975,030 B2* | 7/2011 | Saeed | ........ | H04L 12/4641 709/220 |
| 8,230,050 B1* | 7/2012 | Brandwine | ........ | H04L 45/586 709/220 |
| 2004/0123091 A1* | 6/2004 | Das | ........ | H04L 29/06 713/2 |
| 2006/0184998 A1* | 8/2006 | Smith | ........ | H04L 12/4679 726/3 |
| 2011/0255536 A1* | 10/2011 | Liu | ........ | H04L 12/4641 370/390 |

FOREIGN PATENT DOCUMENTS

| | | |
|---|---|---|
| CN | 101047593 A | 10/2007 |
| CN | 101048978 A | 10/2007 |
| WO | WO 2007140691 A1 * | 12/2007 .......... H04L 12/4679 |

OTHER PUBLICATIONS

International Search Report in International Application No. PCT/IB2014/065842, mailed on Aug. 6, 2015.
Written Opinion of the international Searching Authority in International Application No. PCT/IB2014/065842, mailed on Aug. 6, 2015.

* cited by examiner

*Primary Examiner* — Venkat Perungavoor

(57) ABSTRACT

The present invention discloses methods for establishing Virtual Private Network (VPN) connections among a plurality of VPN gateways at a VPN management server. The VPN management server determines VPN gateways belonging to a first VPN gateway group and also determines the number of possible VPN connections for each VPN gateway of the first VPN gateway group. Configuration for each VPN gateway of the first VPN gateway group is determined based on, at least in part, a VPN connection topology and the number of VPN connection license(s). Each VPN gateway of the first VPN gateway group is configured according to the configuration and a plurality of VPN connections is established based on, at least in part, the configurations.

24 Claims, 13 Drawing Sheets

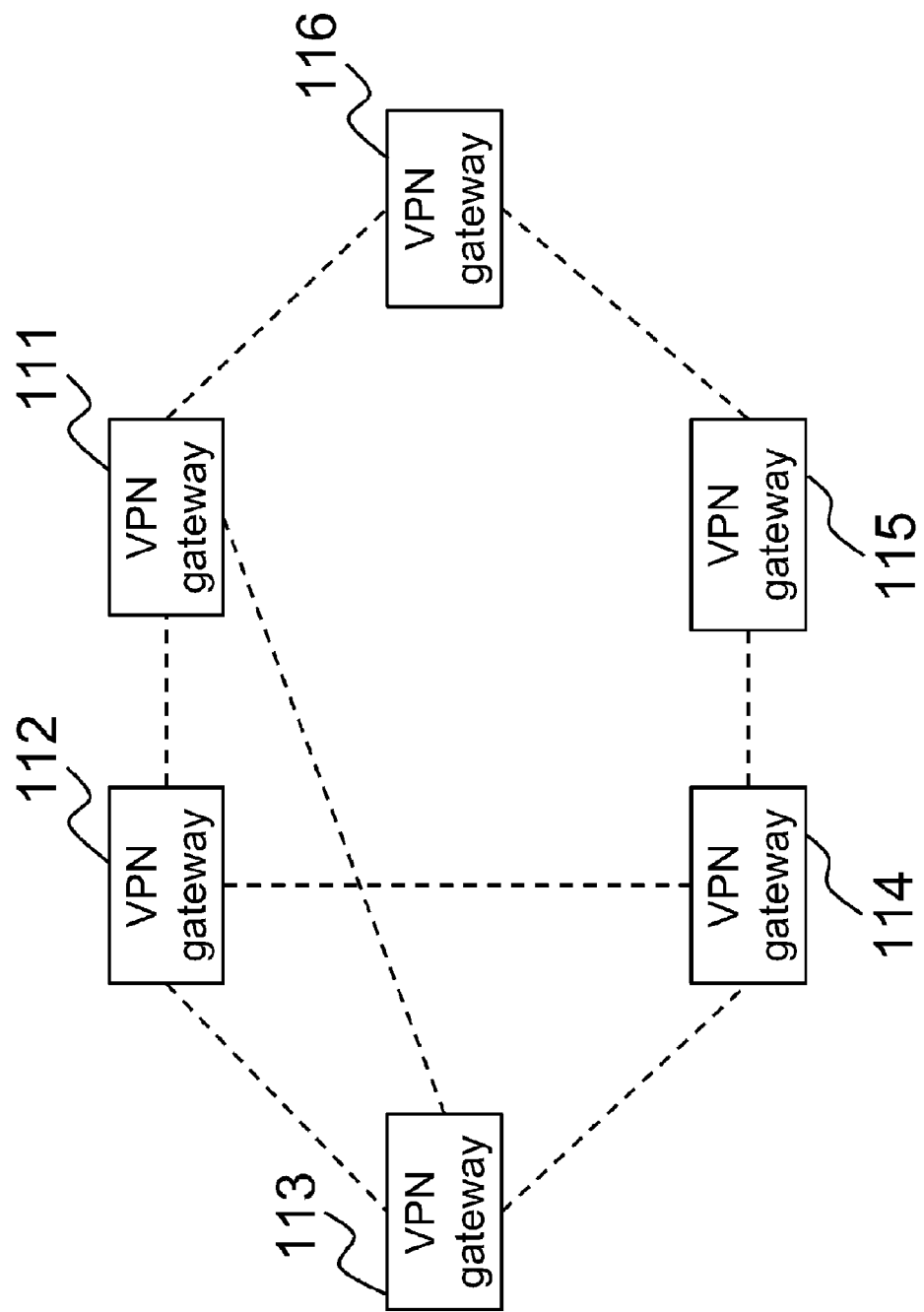

METHODS AND SYSTEMS FOR ESTABLISHING VPN CONNECTIONS AT A VPN MANAGEMENT SERVER

TECHNICAL FIELD

The present invention relates in general to the field of computer networks. More particularly, the present invention discloses methods and systems for establishing Virtual Private Network (VPN) connections among a plurality of VPN gateways at a VPN management server.

BACKGROUND ART

Network providers may offer many types of VPN solutions, one of which involves a full-mesh topology for VPN connections among several VPN gateways. In a full-mesh topology, each VPN gateway forms at least one VPN connection with every other VPN gateway in the VPN community, which means that a large number of VPN connections are established.

In a VPN community, it is desirable to establish full-mesh topology for VPN connections among all VPN gateways in the VPN community. The benefits of a full-mesh VPN network include increase of redundancy, availability and bandwidth. The downsides of a full-mesh topology for VPN connections include increased consumption of computing resources and network resources. In addition, the more VPN connections may require more licenses from hardware vendors, software vendors and/or network operators. As network condition varies, especially for mobile network conditions, there is a need to establish a topology for VPN connections that does not over-consume resources and can adapt change of network conditions, and having means for managing the VPN connections and the resources consumed by them.

DISCLOSURE OF INVENTION

Summary of Invention

According to various embodiments of the present invention, a VPN management server allows establishing VPN connections among a plurality of VPN gateways. The VPN management server first determines members belonging to a first VPN gateway group and the number of possible VPN connections corresponding to each member of the first VPN gateway group. A VPN connection topology is determined for the VPN gateway group and each member of the VPN gateway group is then configured to establish VPN connections according to the VPN connection topology determined, and the number of VPN licenses available for use by each member of the VPN gateway group. Each member of the VPN gateway group then establishes VPN connections with other members of the VPN gateway group according to the configuration.

According to one of the embodiments, the VPN management server first receives a confirmation from an administrator to confirm that the configurations determined are correct. If the confirmation includes an instruction to modify the configuration, the VPN management server modifies the configuration according to the instruction. The VPN management server then configures the VPN gateways of the VPN gateway group to establish VPN connections according to the configuration, or the modified configuration.

According to one of the embodiments, the VPN connection topology is selected from a group consisting of: hub-and-spoke topology, full-mesh topology, and partial-mesh topology.

According to one of the embodiments, the VPN management server is hosted at a remote server or at one of the VPN gateways belonging to the VPN gateway group. The remote server can be accessible through interconnected networks, such as the Internet.

According to one of the embodiments, VPN gateways in a VPN gateway group are assigned with priorities, such that one or more VPN gateways in a VPN gateway group have higher priority than other VPN gateways in the same VPN gateway group. The VPN management server determines the configuration for the VPN gateways to establish VPN connections based on the priorities of the VPN gateways in the VPN gateway group.

According to one of the embodiments of the present invention, one or more of the VPN connections established among the plurality of VPN gateways are aggregated to form an aggregated VPN connection.

According to one of the embodiments, the configuration for the VPN gateways to establish VPN connections is shown on a display or a map.

According to one of the embodiments, the VPN management server receives status information of the established VPN connections from one or more of the VPN gateways that establish the VPN connections. Based on the statuses of the VPN connections, the VPN management server updates the configurations and reconfigures the members of the VPN gateway group according to the updated configurations.

According to one of the embodiments, the number of possible VPN connections that can be established by a VPN gateway is based, at least in part, on the number of VPN connection licenses that the VPN gateway has.

DETAILED DESCRIPTION

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function Embodiments, or portions thereof, may be embodied in program instructions operable upon a processing unit for performing functions and operations as described herein. The program instructions making up the various embodiments may be stored in a storage medium.

The program instructions making up the various embodiments may be stored in a storage medium. Moreover, as disclosed herein, the term "storage medium" may represent one or more devices for storing data, including read only memory (ROM), programmable read-only memory (PROM), erasable programmable read-only memory (EPROM), random access memory (RAM), magnetic RAM, core memory, floppy disk, flexible disk, hard disk, magnetic tape, CD-ROM, flash memory devices, a memory card and/or other machine readable mediums for storing information. The term "machine-readable medium" includes, but is not limited to portable or fixed storage devices, optical storage mediums, magnetic mediums, memory chips or cartridges, wireless channels and various other mediums capable of storing, containing or carrying instruction(s) and/or data. A machine-readable medium can be realized by virtualization, and can be a virtual machine readable medium including a virtual machine readable medium in a cloud-based instance The term "computer-readable medium", "main memory", or "secondary storage", as used herein refers to any medium that participates in providing instructions to a processing unit for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks. Volatile media includes dynamic memory. Transmission media includes coaxial cables, copper wire and fiber optics. Transmission media can also take the form of acoustic or light waves, such as those generated during radio-wave and infrared data communications.

A volatile storage may be used for storing temporary variables or other intermediate information during execution of instructions by processor/processing unit. A non-volatile storage or static storage may be used for storing static information and instructions for processor, as well as various system configuration parameters.

The storage medium may include a number of software modules that may be implemented as software code to be executed by the processing unit using any suitable computer instruction type. The software code may be stored as a series of instructions or commands, or as a program in the storage medium.

Various forms of computer readable media may be involved in carrying one or more sequences of one or more instructions to the processor for execution. For example, the instructions may initially be carried on a magnetic disk from a remote computer. Alternatively, a remote computer can load the instructions into its dynamic memory and send the instructions to the system that runs the one or more sequences of one or more instructions.

A processing unit may be a microprocessor, a microcontroller, a digital signal processor (DSP), any combination of those devices, or any other circuitry configured to process information.

A processing unit executes program instructions or code segments for implementing embodiments of the present invention. Furthermore, embodiments may be implemented by hardware, software, firmware, middleware, microcode, hardware description languages, or any combination thereof.

When implemented in software, firmware, middleware or microcode, the program instructions to perform the necessary tasks may be stored in a computer readable storage medium. A processing unit(s) can be realized by virtualization, and can be a virtual processing unit(s) including a virtual processing unit in a cloud-based instance.

Embodiments of the present invention are related to the use of a computer system for implementing the techniques described herein. In an embodiment, the inventive processing units may reside on a machine such as a computer platform. According to one embodiment of the invention, the techniques described herein are performed by computer system in response to the processing unit executing one or more sequences of one or more instructions contained in the volatile memory. Such instructions may be read into the volatile memory from another computer readable storage medium. Execution of the sequences of instructions contained in the volatile memory causes the processing unit to perform the process steps described herein. In alternative embodiments, hard-wired circuitry may be used in place of or in combination with software instructions to implement the invention. Thus, embodiments of the invention are not limited to any specific combination of hardware circuitry and software A code segment or program instructions may represent a procedure, a function, a subprogram, a program, a routine, a subroutine, a module, a software package, a class, or any combination of instructions, data structures, or program statements. A code segment or program instructions may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

A network interface that may be provided by a device, such as a VPN management server or a VPN gateway is an Ethernet interface, a frame relay interface, a fibre optic interface, a cable interface, a DSL interface, a token ring interface, a serial bus interface, an universal serial bus (USB) interface, Firewire interface, Peripheral Component Interconnect (PCI) interface, etc.

A network interface may be implemented by a standalone electronic component or may be integrated with other electronic components. A network interface may have no network connection or at least one network connection depending on the configuration. A network interface may be an Ethernet interface, a frame relay interface, a fibre optic interface, a cable interface, a Digital Subscriber Line (DSL) interface, a token ring interface, a serial bus interface, a universal serial bus (USB) interface, Firewire interface, Peripheral Component Interconnect (PCI) interface, etc.

A presently preferred embodiment of the present invention may utilize a gateway. A gateway is a device which performs protocol conversion between different types of networks or applications. The term gateway is not meant to be limited to a single type of device, as any device, hardware or software, that may act as a bridge between the user and the networks may be considered a gateway for purposes of this application. The gateway may couple with a plurality of multiple networks. A router, an access point or a wireless access point may all be considered a gateway for purposes of this invention.

Embodiments, or portions thereof, may be embodied in a computer data signal, which may be in any suitable form for communication over a transmission medium such that it is readable for execution by a functional device (e.g., processing unit) for performing the operations described herein. The computer data signal may include any binary digital electronic signal that can propagate over a transmission medium such as electronic network channels, optical fibers, air, electromagnetic media, radio frequency (RF) links, and the like, and thus the data signal may be in the form of an electrical signal, optical signal, radio frequency or other wireless communication signal, etc. The code segments may, in certain embodiments, be downloaded via computer networks such as the Internet, an intranet, LAN, MAN, WAN, the PSTN, a satellite communication system, a cable transmission system, and/or the like.

A network allows a device, such as a VPN management server or a VPN gateway to connect to other networks, such as the Internet and the extranet. A network may be an accessible network carrying one or more network protocol data. A network may be a wired network or a wireless network. A wired network may be implemented using Ethernet, fiber optic, cable, DSL, frame relay, token ring, serial bus, USB, Firewire, PCI, or any material that can pass information. A wireless network may be implemented using infra-red, High-Speed Packet Access (HSPA), HSPA+, Long Term Evolution (LTE), WiMax, GPRS, EDGE, GSM, CDMA, WiFi, CDMA2000, WCDMA, TD-SCDMA, BLUETOOTH, WiBRO, Evolution-Data Optimized (EV-DO); Digital Enhanced Cordless Telecommunications (DECT); Digital AMPS (IS-136/TDMA); Integrated Digital Enhanced (iDEN) or any other wireless technologies.

FIG. 1A is a block diagram representation of a network environment according to various embodiments of the present invention. VPN gateways 111, 112, 113, 114, 115 and 116 may connect to each other through interconnected networks 102, such as the Internet. VPN management server 101 can also connect to VPN gateways 111-116 through interconnected networks 102 using its network interface 205. VPN gateways 111-116 are capable of establishing VPN connections with each other. VPN management server 101 can determine configurations for VPN gateways 111-116 and configure VPN gateways 111-116 through interconnected networks 102.

FIG. 2A is an illustrative block diagram of a VPN management server, such as VPN management server 101, according to various embodiments of the present invention. VPN management server 101 comprises processing unit 201, main memory 202, system bus 203, secondary storage 204, and network interface 205. Processing unit 201 and main memory 202 are connected to each other directly. System bus 203 connects processing unit 201 directly or indirectly to secondary storage 204, and network interface 205. Using system bus 203 allows VPN management server 101 to have increased modularity. System bus 203 couples processing unit 201 to secondary storage 204, and network interface 205. System bus 203 can be any of several types of bus structures including a memory bus, a peripheral bus, and a local bus using any of a variety of bus architectures. Secondary storage 204 stores program instructions for execution by processing unit 201. The scope of the invention is not limited to VPN management server 101 having one network interface, such that VPN management server 101 may have one or more network interfaces.

FIG. 2B is an illustrative block diagram of a VPN gateway, such as VPN gateways 111-116 according to various embodiments of the present invention. For illustration purpose, VPN gateway 116 comprises processing unit 211, main memory 212, system bus 213, secondary storage 214, and network interfaces 215a, 215b, and 215c. Processing unit 211, main memory 212, system bus 213, secondary storage 214, and network interfaces 215a, 215b, and 215c may be connected to each other in a similar manner as that in VPN management server 101 illustrated in FIG. 2A. The scope of the invention is not limited to VPN gateways 111-116 having three network interfaces, such that VPN gateways 111-116 may have one or more network interfaces.

One of the benefits of deploying a VPN connection is extending a first network across a second network, such as the Internet. It enables a node or host to send and receive data across shared or public networks as if it were directly connected to the first network. This can be achieved by establishing a virtual point-to-point connection through the use of dedicated connections, encryption, or a combination of the two.

Those who are skilled in the arts would appreciate that a VPN connection enables encapsulation of data from one type of protocol within the datagram of the same or different protocol. A VPN connection can be a VPN tunnel established using various protocols such as Internet Protocol Security (IPSec), Secure Sockets Layer (SSL), or any other security protocols that can be used to establish VPN tunnels. A plurality of VPN connections can be aggregated to form one aggregated VPN connection. Further details on aggregated VPN connections can be found in U.S. patent application Ser. No. 12/646,774, Filed Dec. 23, 2009, entitled "THROUGHPUT OPTIMIZATION FOR BONDED VARIABLE BANDWIDTH CONNECTIONS". Embodiments of this present invention also apply to aggregated VPN connection. For example, VPN gateway 111 may have three VPN connections with VPN gateway 113 and these three VPN connections are aggregated together for one aggregated VPN connection.

A VPN gateway is capable of forming VPN connections with another VPN gateway, a host or a node. Depending on the resources and/or configuration of the VPN gateway, a VPN gateway can form one or more VPN connections. In general, when a VPN gateway forms more VPN connections, more resources are consumed. For example, processing unit 211 of one of VPN gateways 111-116 may need more processing cycles to perform routing, encryption, decryption, forwarding and receiving data packets in the VPN connections. In another example, the more VPN connections may result in more sessions, and more sessions in general require more memory.

A VPN gateway may also be limited by the number of VPN connection licenses that can be used. In general, one VPN connection license allows one VPN connection to be established in a VPN gateway. For example, a VPN gateway has five VPN connection licenses that it can use to establish five VPN connections with five different VPN gateways. In another example, it can also use the five VPN connection licenses to form three VPN connections with three laptops and form two VPN connections with two VPN gateways. In another example, the administrator of a VPN gateway may choose not to use all VPN connection licenses and reserve one or more VPN connection licenses for other use, such as an emergency VPN connection. However, it is possible that there is no limitation how many VPN connection can be established using one VPN connection license.

For illustration purpose only, a VPN gateway may have enough computing resources to establish six VPN connections but only adequate amount of memory to establish four VPN connections, and therefore the number of possible VPN connections for the VPN gateway is four. In another example, a VPN gateway may have enough computing resources, network resources, memory resources, and other hardware requirements to establish fifty VPN connections, but it only has ten VPN connection licenses. As a result, the number of possible VPN connections for this VPN gateway is only ten.

There could be more than one type of VPN connection license. For example, a first type of VPN connection license is used to form VPN connections with other VPN gateways and a second type of VPN connection license is used to form VPN connections with devices, such as a laptop, a smart-phone, a computer or a server.

Each VPN gateway, depending on the resources it has, may have different number of possible VPN connections that it can establish. A VPN gateway may be able to determine the number of possible VPN connections itself. For example, a VPN gateway may determine the number of possible VPN connections according to resource information, such as computing resources, network resources and memory resources. In another example, a VPN gateway determines the number of possible VPN connections based on the number of VPN connection licenses it can still use. For example, a VPN gateway has six VPN connection licenses and four of the six VPN connection licenses have already been used. Therefore the number of possible VPN connections is six and the number of remaining possible VPN connections (RPVPNC) is two as the VPN gateway can only further establish two VPN connections. The number of RPVPNC is the same or fewer than the number of possible VPN connections as a VPN gateway may have already established one or more VPN connections.

A VPN connection license is, in general, provided by the vendor of VPN software, VPN hardware, and/or VPN operator. For example, when a vendor of a VPN gateway sells the VPN gateway to an administrator, the vendor provides ten VPN connection licenses to the administrator for the VPN gateway use. Therefore, the VPN gateway is able to establish up to ten VPN connections. When the administrator needs more VPN connection licenses, the administrator may need to purchase additional VPN connection licenses from the vendor.

In one variant, the VPN connections licenses are stored at VPN gateways. Therefore, when VPN management server 101 tries to determine how many VPN connection licenses are available, VPN management server 101 communicates with each VPN gateway for the number of VPN connection licenses that are available.

In one variant, the VPN connections licenses are stored at a central database. The central database can be hosted at VPN management server 101, one of VPN gateways, or a remote server. The central database records how many VPN connection licenses are still available for a VPN gateway group.

According to one of the embodiments of the present invention, a database performs as a license repository to record number of VPN connection licenses a VPN gateway has. In one variant, the license repository also provides information regarding the number of VPN connection licenses that a VPN gateway has already deployed. License repository can provide information to VPN management server 101 to assist the VPN management server 101 to determine the number of possible VPN connections and the number of RPVPNC a VPN gateway has.

The license repository can be located in the VPN management server 101 or in another host that can be contacted by the VPN management server 101.

In one variant, the license repository provides VPN license information relating to a VPN gateway group. For example, a VPN gateway group comprises ten VPN gateways and each VPN gateway has five VPN connection licenses. Then the number of VPN connection licenses the VPN gateway group has is fifty and the VPN management server 101 can allocate these fifty VPN connection licenses among the ten VPN gateways. If VPN management server 101 creates a configuration for one of the VPN gateways in the VPN gateway group to establish fifteen VPN connections, there are remaining thirty-five VPN connection licenses can be used by other VPN gateways in the VPN gateway group.

A configuration is used to configure a VPN gateway to establish a VPN connection. A configuration has to include the identity of a VPN gateway that is used to establish the VPN connection and the identity of the VPN connection. For example, the configuration for VPN gateway 116 for establishing a VPN connection with VPN gateway 112 under a hub-and-spoke topology has the identity of VPN gateway 112, such as the IP address and/or hostname of VPN gateway 112. Therefore, processing unit 211 of VPN gateway 116 can form a VPN connection with VPN gateway 112 based on the IP address and/or hostname of VPN gateway 112.

In one variant, the configuration also includes password, private key, public key, certificates, secret words or other information for encrypting and decrypting data packets that are transmitted to and received from the other VPN gateway. These authentication information, encryption information or decryption information can be preconfigured by an administrator and/or determined by VPN management server 101.

FIG. 4 illustrates a configuration according to one of the embodiments of the present invention. Configuration 400 comprises information for establishing VPN connections. Configuration 400 comprises VPN Gateway Identity 401 and VPN connection information 402. Configuration 400 can be stored at VPN management server 101, one or more of VPN gateways 111-116 or any electronic device that can communicate with VPN management server 101 and VPN gateways 111-116. VPN Gateway Identity 401 is used to indicate which of WAN interface(s) of a VPN gateway is used to establish a VPN connection with a WAN interface of a remote VPN gateway. When a VPN gateway only has one WAN interface, the WAN interface identity of the VPN gateway part of VPN Gateway Identity 401 can be omitted. The WAN interface identity of the Remote VPN Gateway part of VPN Gateway Identity 401 is optional as the IP address or hostname of the Remote VPN Gateway of VPN Gateway Identity 401 is adequate to identify the WAN interface of the remote VPN gateway. However, it is useful for an administrator to associate an IP address with a WAN interface when configuring or managing VPN connection.

VPN connection information 402 is mainly used to contain information for establish a VPN connection between two VPN gateways. For example, VPN connection information 402 may contain encryption information used to establish the VPN connection, including a pre-shared key, an encryption method, authentication information, Diffie-Hellman group information and key-life information. In another example, VPN connection information may contain information to setup Internet Protocol Security (IPsec). Those who are skilled in the art would appreciate that there are many other information can be used to set up encryption and decryption mechanism used in VPN connection.

For example, configuration 400 is sent by VPN management server 101 to VPN gateway 111. When VPN gateway 111 receives configuration 400, it establishes VPN connection according to Remote VPN Gateway Identity 401 and VPN connection information 402. For illustration purpose, Remote VPN Gateway Identity 401*a* and VPN connection 402*a* contain a WAN interface identity of VPN gateway 111, IP address of VPN gateway 112, the WAN interface identity of VPN gateway 112 and encryption information for VPN gateway 111 to establish a VPN connection with VPN gateway 112. Similarly, VPN Gateway Identity 401*b* and VPN connection 402*b* may contain information for VPN gateway 111 to establish a VPN connection with VPN gateway 113;

and VPN Gateway Identity 401c and VPN connection 402c may contain information for VPN gateway 111 to establish a VPN connection with VPN gateway 114.

Configuration 400 is sent through interconnected networks 102. Configuration 400 can be sent using Transmission Control Protocol (TCP), User Datagram Protocol (UDP) or other communication protocols. Contents of configuration 400, such as Remote VPN Gateway Identity 401 and VPN connection information 402 can be represented in any format, including string, binary data, Extensible Markup Language (XML) format, and JavaScript Object Notation (JSON), as long as being able to be used and recognized by a VPN gateway.

In another example, the configuration for VPN gateway 116 to establish a plurality of VPN connection with VPN gateways 111-115 under a full-mesh topology has the identity of VPN gateways 111-115, such as the IP address and/or hostname of VPN gateways 111-115.

In one variant, when configurations have been sent to VPN gateways 111-116, VPN management server 101 is not be required to be in operation as VPN gateway 111-116 are then able to form VPN connections among themselves. However, for maintenance purpose, reliability purpose, and/or security purpose, VPN management server 101 is preferred to remain in operation to monitor status of the VPN connections. For the same reason, it may be desired to have a backup VPN management server in case VPN management server 101 is out of order or not reachable.

There are three most common VPN connection topologies, namely hub-and-spoke topology, partial-mesh topology, and full-mesh topology.

Referring to FIG. 1B, the topology is a hub-and-spoke topology for a VPN gateway group comprising VPN gateways 111-116. VPN management server 101 creates configurations for VPN gateways 111-116 respectively in the way that VPN gateway 116 performs as hub and VPN gateways 111-115 perform as the spoke. For example, in order for VPN gateway 111 to send and receive packets with VPN gateway 112, the packets have to pass through VPN gateway 116. In one variant, there can be more than one hub. For example, VPN gateway 115 is a backup-hub that in case VPN gateway 116 is out-of-order, VPN gateway 115 can perform as the hub for the VPN gateway group. In one variant, the topology and configurations are replicated at VPN gateway 115 as it VPN gateway 115 performs as a backup-hub. In one variant, the topology and configurations can be downloaded from VPN management server 101 to a new VPN gateway that is used to replace one of VPN gateways 111-116. This allows the new VPN gateway has the same configuration as the replaced VPN gateway. When the new VPN gateway is connected to VPN management server 101 and identifies itself as a replacement for the replaced VPN gateway, VPN management server 101 can then send or download the configurations to the new VPN gateway.

Referring to FIG. 1C, the topology is a partial-mesh topology for a VPN gateway group comprising VPN gateways 111-116. VPN management server 101 creates configurations for VPN gateways 111-116 respectively such that they form a partial-mesh. For illustration purpose, VPN gateway 111 forms VPN connections with VPN gateways 112, 116 and 113, VPN gateway 112 forms VPN connections with VPN gateways 113, 111 and 114, VPN gateway 113 forms VPN connections with VPN gateways 114, 112 and 111, VPN gateway 114 forms VPN connections with VPN gateways 115, 113 and 112, VPN gateway 115 forms VPN connections with VPN gateways 114 and 116, VPN gateway 116 forms VPN connection with VPN gateways 111 and 115. Therefore, not all VPN gateways establish VPN connections with each other, and hence a partial-mesh is formed.

Referring to FIG. 1D, the topology is a full-mesh topology for a VPN gateway group comprising VPN gateways 111-116. VPN management server 101 creates configurations for VPN gateways 111-116 respectively such that they form a full-mesh. Each of the VPN gateways 111-116 establishes VPN connections with each other as illustrated in FIG. 1D.

In one variant, a VPN connection license can be used for one VPN connection or one aggregated VPN connection. Therefore a VPN gateway can establish one aggregated VPN connection or one VPN connection with another VPN gateway, regardless the number of VPN connections that are comprised in the aggregated VPN connection. In one example, VPN gateway 114 has one VPN connection license. VPN gateway 114 can establish one aggregated VPN connection with VPN gateway 115 and the aggregated VPN connection comprises multiple VPN connections. The number of RPVPNC of a VPN gateway can be considered by VPN management server 101 as the number of remaining possible aggregated VPN connections.

Alternatively, when number of possible VPN connections is mainly affected by computing resources or networking resources, the number of RPVPNC of a VPN gateway cannot be considered by VPN management server 101 as the number of remaining possible aggregated VPN connections because a VPN gateway may not have adequate computing resources or networking resources to establish many aggregated VPN connections if each of the aggregated VPN connections comprise many VPN connections. In one example, at first VPN gateway 115 has thirty RPVPNC. Then VPN gateway establishes an aggregated VPN connection with VPN gateway 116 and the aggregated VPN connection is comprised of eight VPN connections. The number of RPVPNC for VPN gateway 115 then becomes twenty-two as eight VPN connections have been established for the aggregated VPN connection.

The number of VPN connections and the number of RPVPNC can be requested by VPN management server 101.

One of the functions of a VPN management server is to determine a configuration for each VPN gateway. A configuration can be used to configure a VPN gateway to establish one or more VPN connections for forming a VPN gateway group. The VPN management server can make request to a VPN gateway to determine the number of RPVPNC of a VPN gateway, and it is capable of coordinating the configurations to achieve the selected topology. In one variant, the VPN management server determines the number of RPVPNC by accessing a central database. The central database has the information of the number of RPVPNC. The database may be stored locally or remotely. In one variant, VPN management server is capable of determine the configurations to achieve the selected topology with optimal results.

FIG. 3A is a flowchart illustrating process of one of the embodiments of the present invention. At step 301, VPN management server 101 determines the members belonging to the first VPN gateway group. VPN management server 101 can download the member list from a database, retrieve the member list from a remote server or contact VPN gateways that VPN management server 101 is aware of to find out whether the VPN gateways belong to the first VPN gateway group. The member list can be pre-configured by an administrator.

As a VPN gateway may form one or more VPN connections with one or more VPN gateways, the VPN gateway may be a member of one or more VPN gateway groups.

In one variant, a member can be a host device, such as a laptop, a smart-phone, a computer, a server, or any other device that is capable of establishing VPN connections with another member.

At step 302, VPN management server 101 determines number of RPVPNC a VPN gateway has. VPN management server 101 determines the number of RPVPNC by communicating with each VPN gateway to discover the number of RPVPNC. For example, VPN management server 101 sends a message to each VPN gateway of the first VPN group for the discovering. In one variant, the messages can be sent periodically, such that VPN management server 101 can have updated information of the number of the number of RPVPNC a VPN gateway has. In one variant, VPN management server 101 does not send out messages if it already knows that number of the number of RPVPNC. For example, among VPN gateways 111 to 116, VPN management server 101 already knows the number of RPVPNC of VPN gateways 111 and 112, VPN management server 101 only sends message to VPN gateways 113 to 116 to discover the number of RPVPNC of each VPN gateways 113 to 116.

At step 303, VPN management server 101 determines what VPN connection topology that the first VPN gateway group adopts. For example, the first VPN gateway group may adopt a hub-and-spoke topology, a partial-mesh topology or a full-mesh topology. The VPN connection topology can be preconfigured, entered by an administrator, retrieved from a database or retrieved from a remote server. In one variant, step 303 is performed before steps 301 or 302. Step 303 has to be performed before step 304 in order to allow VPN management server 101 to have correct configuration based on the identity of a VPN gateway and topology determining the VPN connections.

At step 304, VPN management server 101 determines configuration for each VPN gateway based on the number of RPVPNC and topology.

At step 305, VPN management server 101 configures each of the VPN gateways of the first VPN gateway group according to the corresponding configuration. There are myriad ways to configure a VPN gateway. For example, VPN management server 101 sends a corresponding configuration to the VPN gateway 112 and relies on the VPN gateway 112 to configure itself according to the corresponding configuration. In another example, VPN management server 101 logs in to a VPN gateway 113 and then configures the VPN gateway 113. There are myriad ways for VPN management server 101 to log in and configure a VPN a gateway, for example VPN management server 101 can perform the logging and configuration through a web interface or Secure Shell protocol.

At step 306, VPN gateways 111-116 establish VPN connections according to the corresponding configuration.

FIG. 3B is a flowchart illustrating process of one of the embodiments of the present invention. The difference between the flowcharts of FIG. 3A and FIG. 3B is that there is an additional step 311 between step 304 and 305. Before VPN management server 101 performing step 305, VPN management server 101 will wait for a confirmation. The confirmation can be in form of a message, a string, a number, an instruction, etc. The confirmation contains information to inform VPN management server 101 whether the configurations determined in step 304 are final or not. The confirmation can be provided by an administrator, a host, a server, a device or any other electronic apparatus that is authorized to send the confirmation. The confirmation can be received through a web interface, a command-line interface, a graphical user interface, a button, or etc.

In one variant, when the confirmation indicates that the configurations are not final, VPN management server 101 performs the steps 301 to 304 again as members of the first VPN gateway group may have changed, the number of RPVPNC may have been changed. In one variant, an administrator of VPN management server 101 is prompted to modify the configurations. This provides flexibility to allow the administrator to alter one or more configurations.

In one variant, the configurations are shown to the administrator through a graphical user interface. For example, as the configurations have been determined by VPN management server 101 after step 305, VPN management server 101 shows how VPN gateways are connected with each other as illustrated in FIG. 6 through a user interface. The user interface is discussed in greater detail later. The administrator can then modify one or more configurations through the user interface. The user interface can be a display of a computing device coupled to the VPN management server 101 or a display of a computing device connected to the VPN management server 101 through a network. When the administrator has finalized the configurations at step 311, the VPN management server 101 then performs steps 305. At step 306, VPN gateways 111-116 establish VPN connections according to the corresponding configuration finalized by the administrator. In one variant, the locations of VPN gateways 111-116 are shown on a map, such that a user can identify the location of the VPN gateways 111-116

In one variant, when a user changes the configuration through the user interface and then submits the configuration to VPN management server 101, the submission is considered as a confirmation.

The purpose of the confirmation is to ensure that the configurations are correct. In one variant, an administrator receives a request for confirmation after step 304. In one variant, the administrator has an opportunity to change one or more configurations when receiving the request. The changed one or more configurations will then be sent back to VPN management server 101. Once VPN management server 101 has received the changed configuration, VPN management server 101 will then perform step 305. The changed one or more configurations also follows the structure of configuration 401.

In one example, configurations for VPN gateways 111 and 112 after step 304 have one VPN connection with VPN gateway 116 respectively. The configurations are then being sent to a user interface for the administrator's confirmation. The administrator may modify the configuration, for example, to have one additional VPN connection between VPN gateways 111 and 112. When VPN management server 101 receives the administrator's changed configurations at step 311, the changed configurations can be considered as the confirmation. Then VPN management server 101 configures VPN gateways 111 and 112 at step 305. VPN gateways 111 and 112 then establishes the VPN connections at step 306. The VPN connections established at step 306 are: one VPN connection between VPN gateway 111 and 116, one VPN connection between VPN gateway 111 and 112 and one VPN connection between VPN gateway 112 and 116.

FIG. 3C is a flowchart illustrating process of one of the embodiments of the present invention. The difference between the flowcharts of FIG. 3A and FIG. 3C is that there are additional steps 321-323 after step 306. As network environment changes, VPN connections may be terminated or may become unstable. Therefore, VPN gateways reports status of VPN connections established to VPN management server 101. When VPN management server 101 receives the status at step 321, it determines whether to change, add or terminate VPN connection(s) among VPN gateways at step 322. When there is a need to change, add or terminate VPN connection(s), VPN management server 101 updates configuration(s) at step 322 and reconfigures the corresponding VPN gateway(s) with the updated configuration(s) at step 323. The corresponding VPN gateway(s) then can change, add or terminate VPN connection(s) according to the updated configuration at step 305.

The status can be sent to VPN management server 101 through a web page, command-line interface, graphical interface and etc. The status can be sent through secured or non-secured interconnected networks. The status allows VPN management server 101 to determine whether a VPN connection is stable, is experiencing network problem, has been terminated and etc.

In another example, for illustration purpose only, for VPN gateway 116 to report status of its VPN connection identity as shown in FIG. 1B, FIG. 1C, or FIG. 1D, the status contains two strings "With VPN gateway 115-stable" and "With VPN gateway 111-terminated" to indicate that the VPN connection with VPN gateway 115 is stable and the VPN connection with VPN gateway 111 has already been terminated.

The status is not limited to be represented by strings and can be represented using binary data, XML style message, combinations of text and binary data or any other format that is recognizable by the VPN management server 101.

The frequency for VPN gateways to send status to VPN management server 101 can be periodic and/or after a change of a VPN connection is detected.

According to one of the embodiments of the present invention, one or more VPN gateways of a VPN gateway group have higher priority than other VPN gateways in the same VPN gateway group. VPN management server 101 will create configurations to connect as many other VPN gateways as possible to the VPN gateway with highest priority first. The number of other VPN gateways that can be connected to VPN gateway with highest priority is limited by the number of RPVPNC.

In another example, VPN gateway 116 has the highest priority and VPN gateway 115 has the second highest priority. When VPN management server 101 creates a configuration for VPN gateway 114 in the first VPN gateway group, VPN management server 101 will first try to have a configuration to have VPN gateway 114 to establish a VPN connection with VPN gateway 116 if the number of RPVPNC of VPN gateway 116 is not zero. If the number of RPVPNC of VPN gateway 116 is zero, then VPN management server 101 will first try to have a configuration to have VPN gateway 114 to establish a VPN connection with VPN gateway 115 if the number of RPVPNC of VPN gateway 115 is not zero.

The priority can be configured by the administrator the VPN gateway group through a web page, web service, API, console, and/or user interface of VPN management server 101.

The use of priority allows flexibility in creating configuration to address specific needs of a VPN gateway group. For example, referring to FIG. 1B, VPN gateway 116 is connected with a plurality of high-speed Internet connection and is best used to perform as a hub for the VPN gateway group to connect to the Internet. Therefore VPN gateway 116 should have the highest priority. VPN gateway 115 is located at a data centre for disaster recovery or redundancy. Therefore, VPN gateway 115 is assigned with the second highest priority for the purpose of for disaster recovery or redundancy. VPN gateway 115 can perform as a backup-hub for the VPN gateway group. When VPN gateway 116 is unable to perform as a hub for the VPN gateway group, VPN gateways 111-114 can then use VPN gateway 115 as the hub.

FIG. 5 illustrates the process in step 304 to determine configurations according to one of the embodiments of the present invention. The process starts in step 501. In step 502, VPN management server 101 determines whether the topology is a partial-mesh topology. If the topology is not a partial-mesh topology, the topology should be either a full-mesh topology or a hub-and-spoke topology and step 507 is performed.

In step 507, if the topology is a hub-and-spoke topology, VPN management server 101 first determines the identity of the VPN gateway that serves as a hub and then configures a configuration for each VPN gateway that each configuration is configured to establish a VPN connection with a hub. If the topology is full-mesh, the configuration for each VPN gateway is configured to establish VPN connections with all other VPN gateways in the same VPN gateway group.

If the topology is a partial-mesh topology, step 503 is performed to identify VPN gateway(s) that has (have) number of RPVPNC more than zero. If the number of RPVPNC of a VPN gateway is zero, this implies that the VPN gateway has no more resources to establish an additional VPN connection. Therefore, in step 503, VPN management server 101 only needs to configure VPN gateway that still have resources to establish one additional VPN connection. In Step 504, VPN management server 101 pairs up two VPN gateways that have number of RPVPNC more than zero for establishing a VPN connection between these two VPN gateways and then reduce the number of RPVPNC of these two gateways by one.

In step 505, if none or only one of the VPN gateways in the VPN gateway group has the number of RPVPNC more than zero, this implies that there is no pair of VPN gateways that have resources to establish the additional VPN connection and the process then stops at step 508.

In step 506, VPN management server 101 determines whether all identified VPN gateways have been paired up. If not step 504 is performed again with another pair of VPN gateways.

In one variant, the VPN gateways that have been paired up earlier in step 504 will not be paired again with another VPN gateway until all other VPN gateways in the VPN gateway group has at least one VPN connection. This avoids the situation that some of the VPN gateways are isolated. One or more VPN gateways can be isolated from other VPN gateways as there are not enough RPVPNC to connect the isolated VPN gateways with the other VPN gateways.

In one variant, the VPN gateways are paired up sequentially in step 504. For example, using FIG. 1A for illustration, VPN gateways 111-116 all have three RPVPNC initially. Configurations are created for the VPN gateways by VPN management server 101 in cycles following the sequence: VPN gateway 111, VPN gateway 112, VPN gateway 113, VPN gateway 114, VPN gateway 115, VPN gateway 116 and then again starting from VPN gateway 111. In the first cycle, VPN management server 101 will first pair up VPN gateways 111 and 112 by having the configuration for VPN gateway 111 to establish a VPN gateway 112 and having the configuration for VPN gateway 112 to establish a VPN gateway 111. Then VPN management server 101 pairs up VPN gateways 112 and 113 by having the configuration for VPN gateway 112 to establish a VPN gateway 113 and having the configuration for VPN gateway 113 to establish a VPN gateway 112. Then VPN management server 101 pairs up VPN gateways 113 and 114 by having the configuration for VPN gateway 113 to establish a VPN gateway 114 and having the configuration for VPN gateway 114 to establish a VPN gateway 113.

Then VPN management server 101 pairs up VPN gateways 114 and 115 by having the configuration for VPN gateway 114 to establish a VPN gateway 115 and having the configuration for VPN gateway 115 to establish a VPN gateway 114. Then VPN management server 101 pairs up VPN gateways 115 and 116 by having the configuration for VPN gateway 115 to establish a VPN gateway 116 and having the configuration for VPN gateway 116 to establish a VPN gateway 115. Then VPN management server 101 pairs up VPN gateways 116 and 111 by having the configuration for VPN gateway 116 to establish a VPN gateway 111 and having the configuration for VPN gateway 111 to establish a VPN gateway 116.

Then, after the first cycle, all VPN gateways 111-116 have established two VPN connections each, and therefore each of VPN gateways 111-116 have one RPVPNC. In the second cycle, VPN management server 101 then determines to configure VPN gateway 111 to establish another VPN connection, as VPN connection 111 is next in sequence after VPN gateway 116, and also has one RPVPNC. As VPN management server 101 already had the configuration for VPN gateway 111 to establish a VPN connection with VPN gateway 112, VPN management server 101 pairs up VPN gateway 111 with VPN gateway 113, as VPN gateway 113 is the next in the sequence after VPN gateway 112. VPN management server 101 pairs up VPN gateway 111 with VPN gateway 113 by having the configuration for VPN gateway 111 to establish a VPN gateway 113 and having the configuration for VPN gateway 113 to establish a VPN gateway 111. The number of RVPNC of VPN gateway 111 is then zero because VPN gateway 111 already has three VPN connections with VPN gateways 112, 116 and 113 respectively. The number of RVPNC of VPN gateway 113 is also zero because VPN gateway 113 already has three VPN connections with VPN gateways 114, 111 and 112 respectively. VPN management server 101 then determines to configure VPN gateway 112 to establish another VPN connection, as VPN connection 112 is next in sequence after VPN gateway 111, and also has one RPVPNC. As VPN management server 101 already had the configuration for VPN gateway 112 to establish a VPN connection with VPN gateway 113, and the RPVPNC of VPN gateway 113 is zero, VPN management server 101 pairs up VPN gateway 112 with VPN gateway 114, since VPN gateway 114 is the next in the sequence after VPN gateway 113. VPN management server 101 pairs up VPN gateway 112 with VPN gateway 114 by having the configuration for VPN gateway 112 to establish a VPN gateway 114 and having the configuration for VPN gateway 114 to establish a VPN gateway 112. The number of RVPNC of VPN gateway 112 is then zero because VPN gateway 112 already has three VPN connections with VPN gateways 111, 113 and 114 respectively. The number of RVPNC of VPN gateway 114 is also zero because VPN gateway 114 already has three VPN connections with VPN gateways 113, 115 and 112 respectively. There is no other VPN gateways that VPN gateways 115 and 116 can be paired up to establish additional VPN connections as VPN gateways 111, 112, 113 and 114 will have no further resources to establish additional VPN connections and VPN gateways 115 and 116 already have VPN connections with each other. After the second cycle, VPN gateways 115 and 116 still have one RPVPNC each, and VPN gateways 111-114 have zero RPVPNC. Therefore, FIG. 1C illustrates the resulting VPN connections established according to the configurations determined by the VPN management server 101.

FIG. 6 is a user interface illustrating how VPN gateways are connected to each other. Items 601-608 represent VPN gateways 111-118 respectively. In this example, VPN gateways 111-118 belong to a first VPN gateway group in which VPN connections are established using hub-and-spoke topology, and VPN gateways 117, 118, 120, 121, and 122 belong to a second VPN gateway group in which VPN connections are established using mesh topology. In order to have a user-friendly illustration, it is preferred that VPN gateways belonging to the same VPN gateway group are coloured or patterned with the same colour or pattern in the same user interface. For illustration purposes, items corresponding to the first VPN gateway group are white coloured and items corresponding to the second VPN gateway group have a striped pattern. Since VPN gateways 117 and 118 belong to both the first VPN gateway group and the second VPN gateway group, items 607 and 608 have a different pattern than items corresponding to the first or second VPN gateway group. Alternatively, the pattern or colour of items corresponding to both VPN gateway groups may be a combination of the colour of items corresponding to each VPN gateway group. For example, one half of the circle in item 607 may be white coloured and another half of the circle in item 607 may have a striped pattern. There may be various ways to illustrate that particular items correspond to both VPN gateway groups, and the scope of the invention is not limited to the above examples. Item 606 is connected to items 601-605 and items 607-608, showing that VPN gateway 116 acts as the hub for the first VPN gateway group. Items 610-612 represent VPN gateways 120-122 respectively. In user interface 600, items 607, 608, 610, 611, and 612 are connected to each other, showing that VPN connections are established between VPN gateways 117, 118, 120, 121, and 122 using mesh topology. VPN gateways 121 and 122 are also connected to each other through a VPN connection using point-to-point topology.

In one example, an administrator may configure the VPN gateways in the second VPN gateway group to be connected to each other in a full-mesh topology. Due to lack of resources of the VPN gateways, the VPN connections may be established in a partial-mesh topology as shown in user interface 600.

FIG. 7 is a user interface illustrating geographical locations of VPN gateways in a map, and how the VPN gateways are connected to each other. Geographical locations of VPN gateways 111-118 and 120-122 are illustrated in user interface 700. In this example, VPN connections are established between VPN gateways 111-118 using a hub-and-spoke topology, and VPN gateway 116 acts as the hub. VPN connections are established between VPN gateways 117, 118, 120, 121 and 122 using a partial-mesh topology. User interface 700 illustrates the VPN connections that are established between VPN gateways 111-118 and between VPN gateways 117, 118, 120, 121, and 122.

BRIEF DESCRIPTION OF DRAWINGS

FIG. 1C is a block diagram illustrating the topology for a VPN gateway group according to one of the embodiments of the present invention.

Figure 1A:
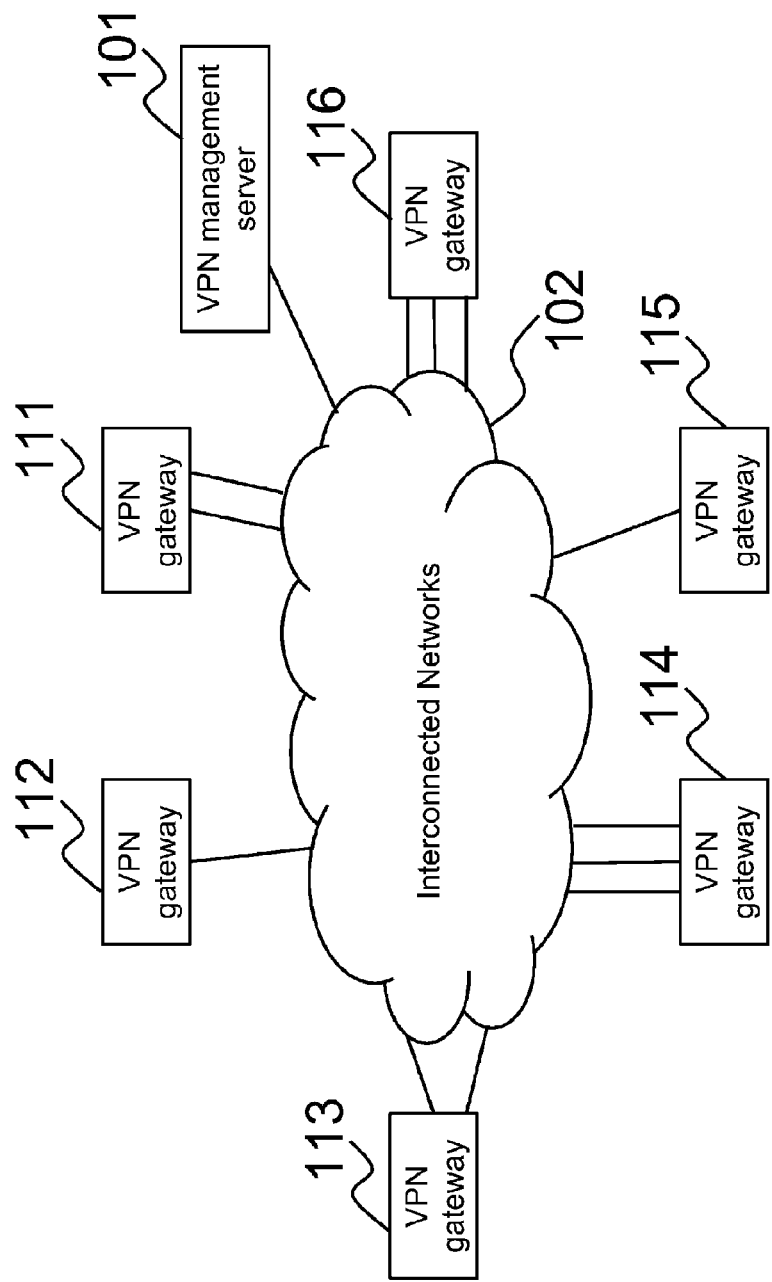
FIG. 1A is a block diagram representation of a network environment according to various embodiments of the present invention.
Figure 1B:
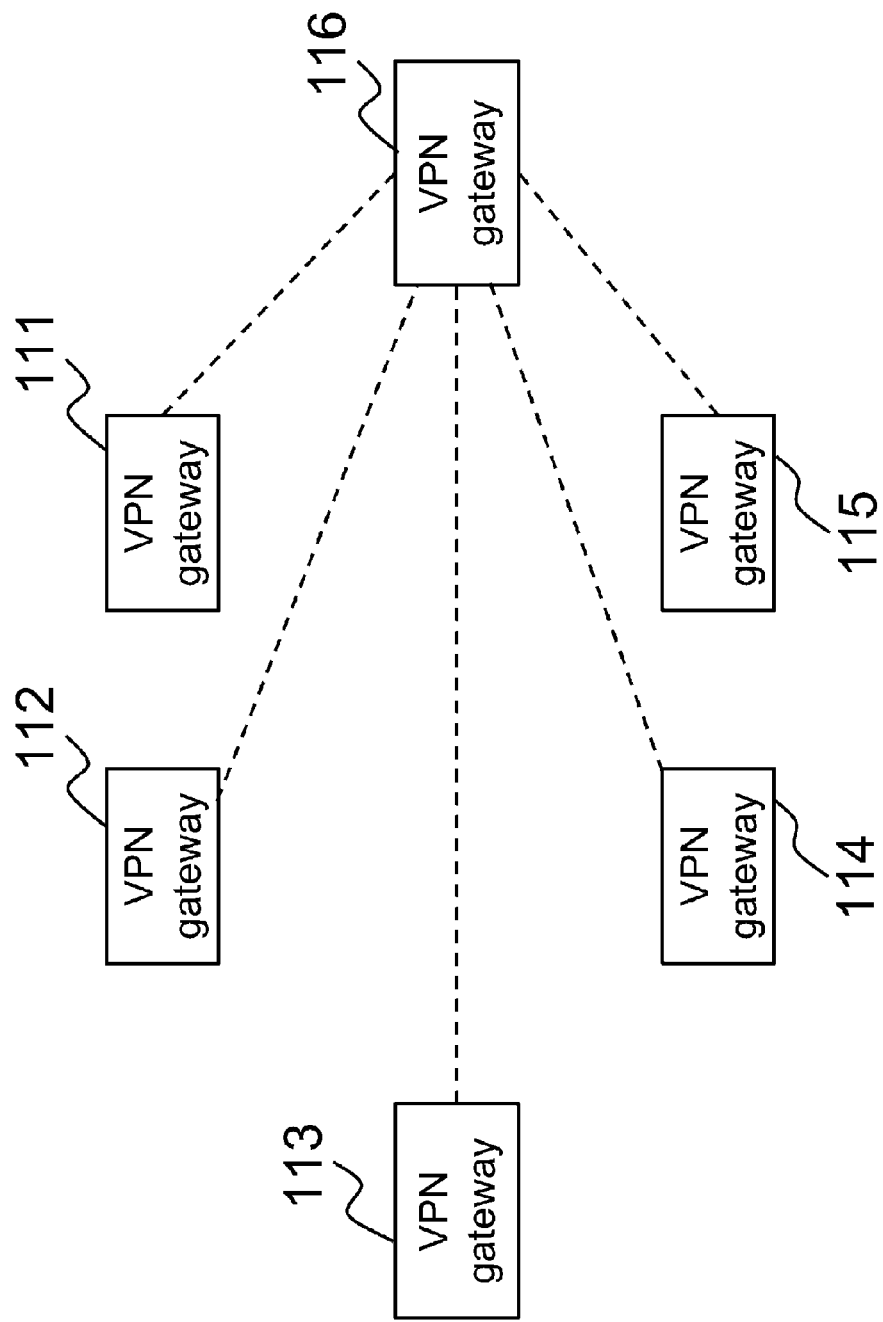
FIG. 1B is a block diagram illustrating the topology for a VPN gateway group according to one of the embodiments of the present invention.
Figure 1D:
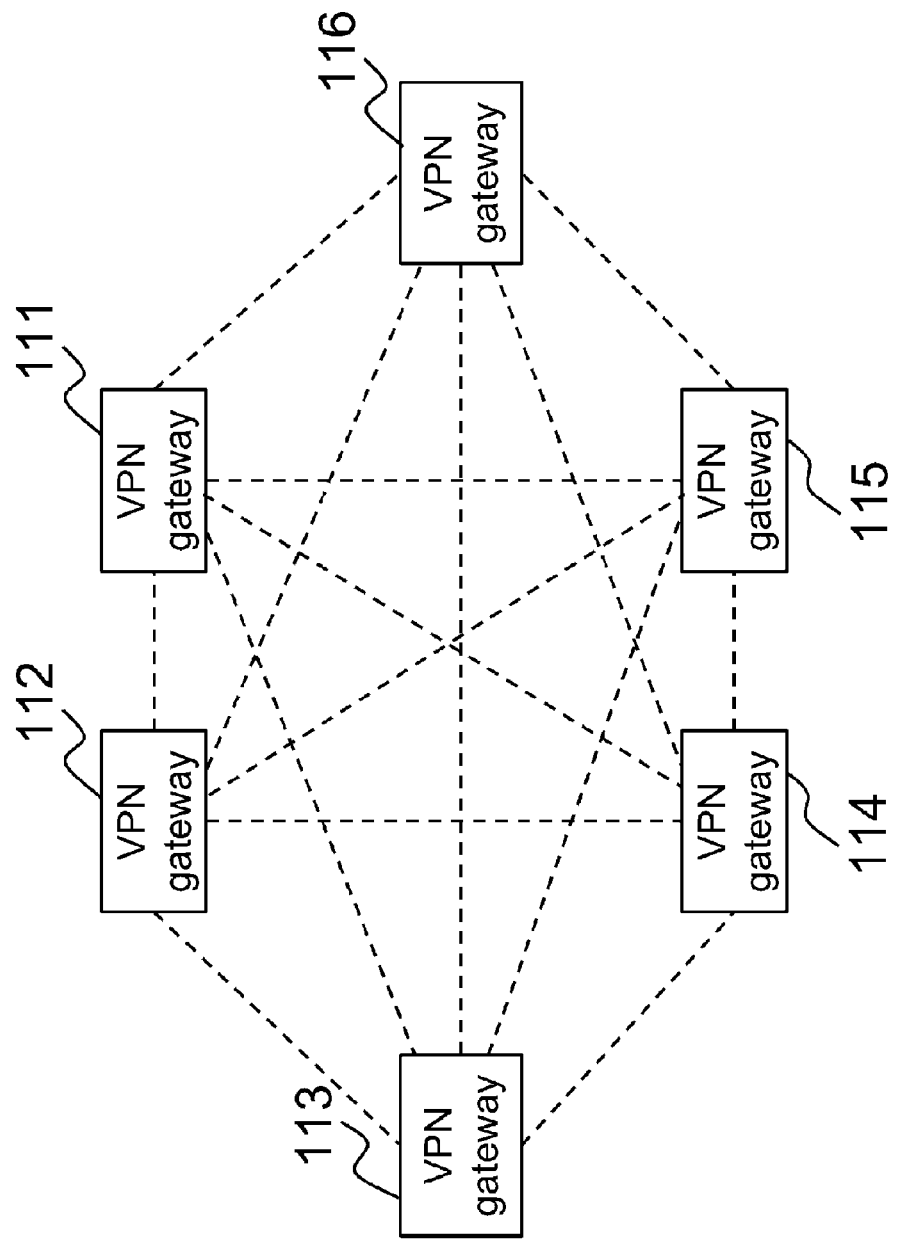
FIG. 1D is a block diagram illustrating the topology for a VPN gateway group according to one of the embodiments of the present invention.
Figure 2A:
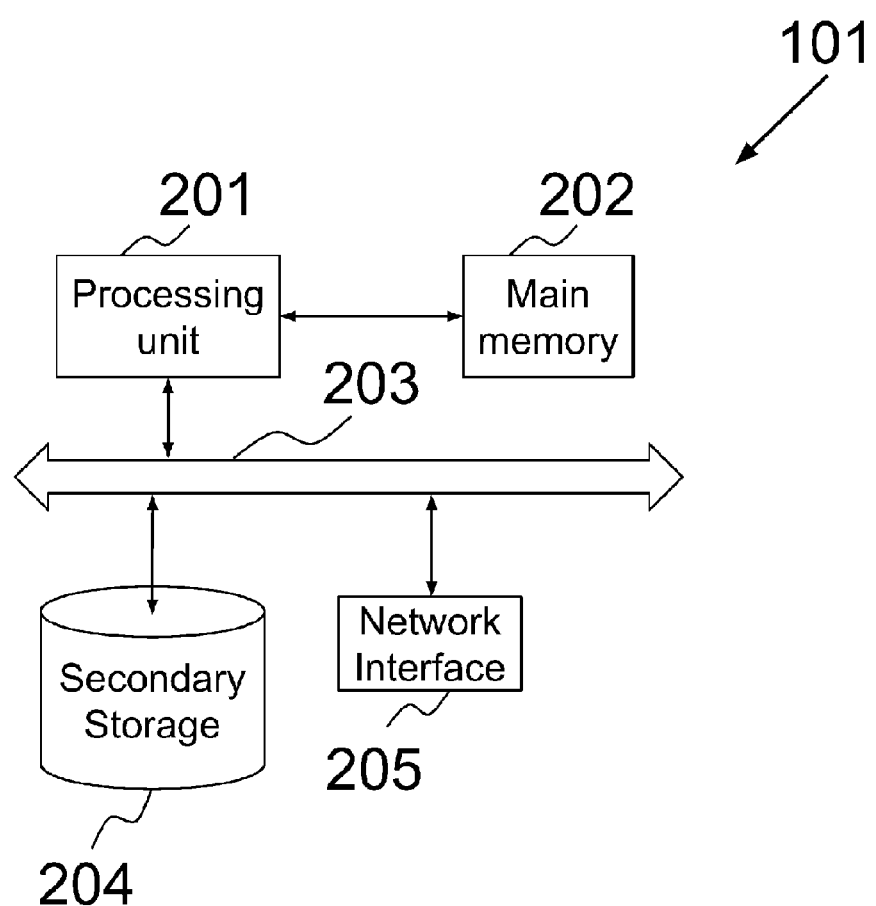
FIG. 2A is an illustrative block diagram of a VPN management server according to various embodiments of the present invention.
Figure 2B:
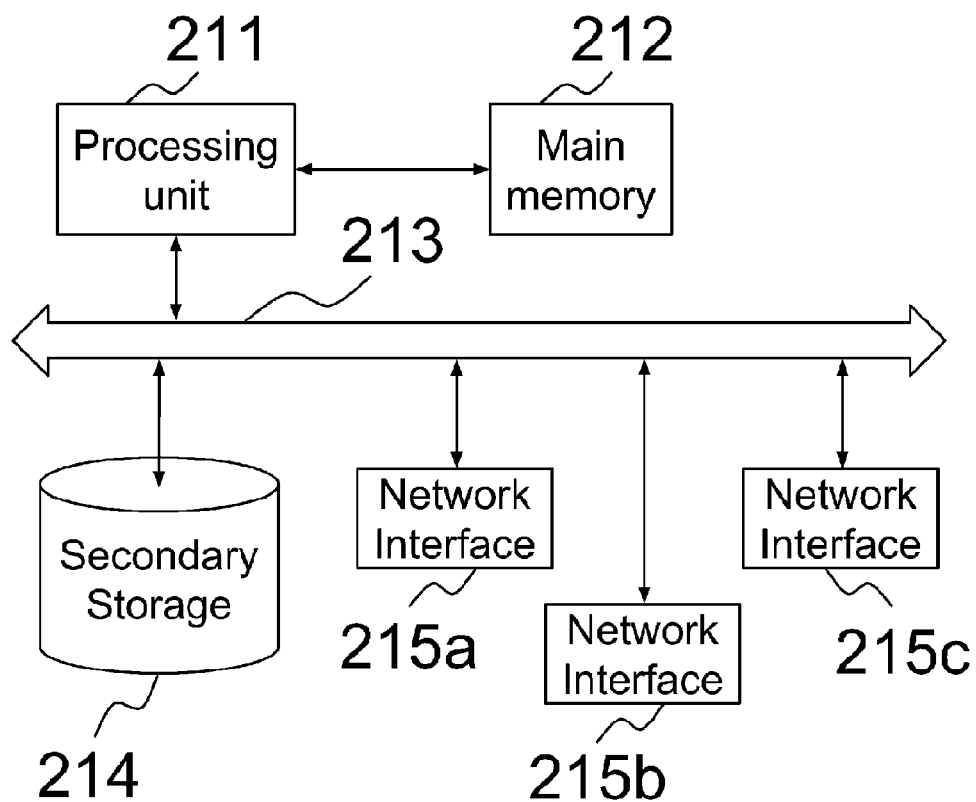
FIG. 2B is an illustrative block diagram of a VPN gateway according to various embodiments of the present invention.
Figure 3A:
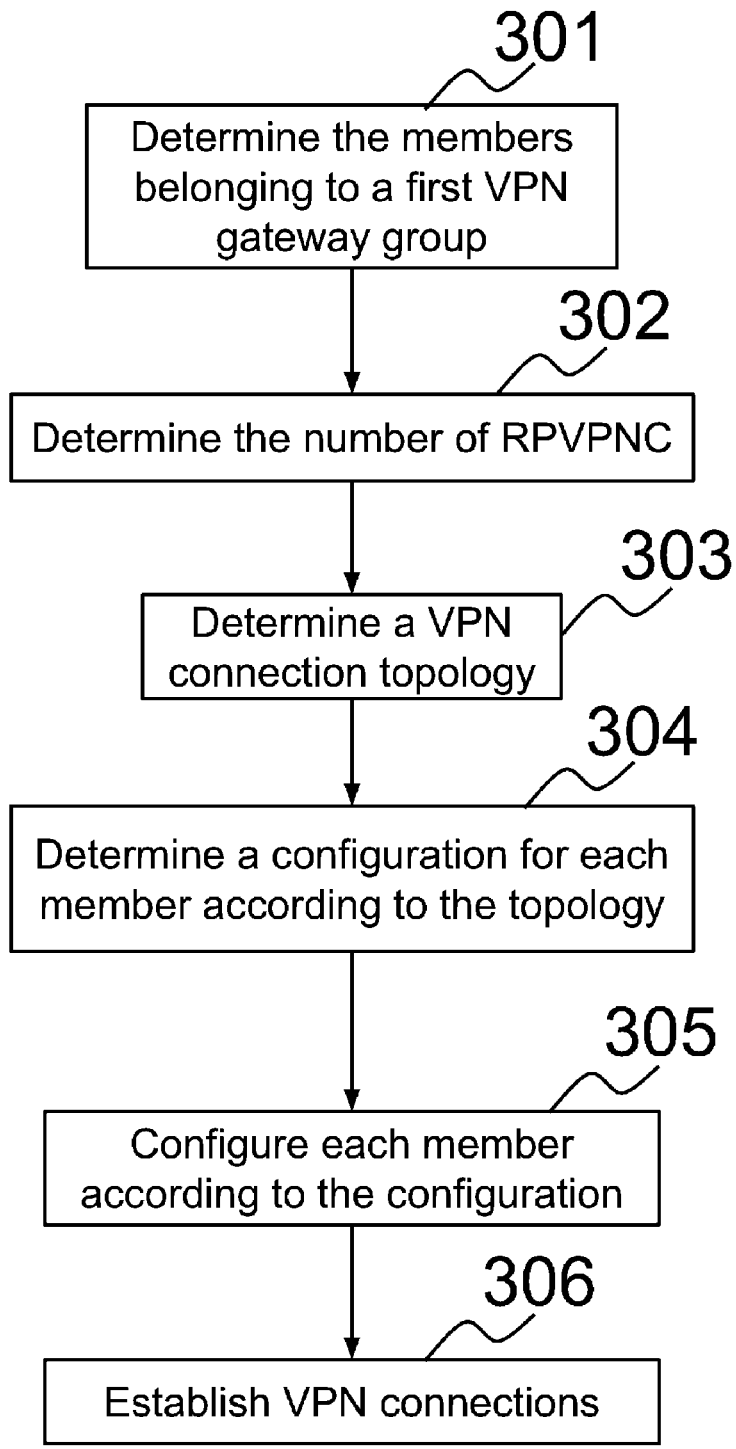
FIG. 3A is a flowchart illustrating process of one of the embodiments of the present invention.
Figure 3B:
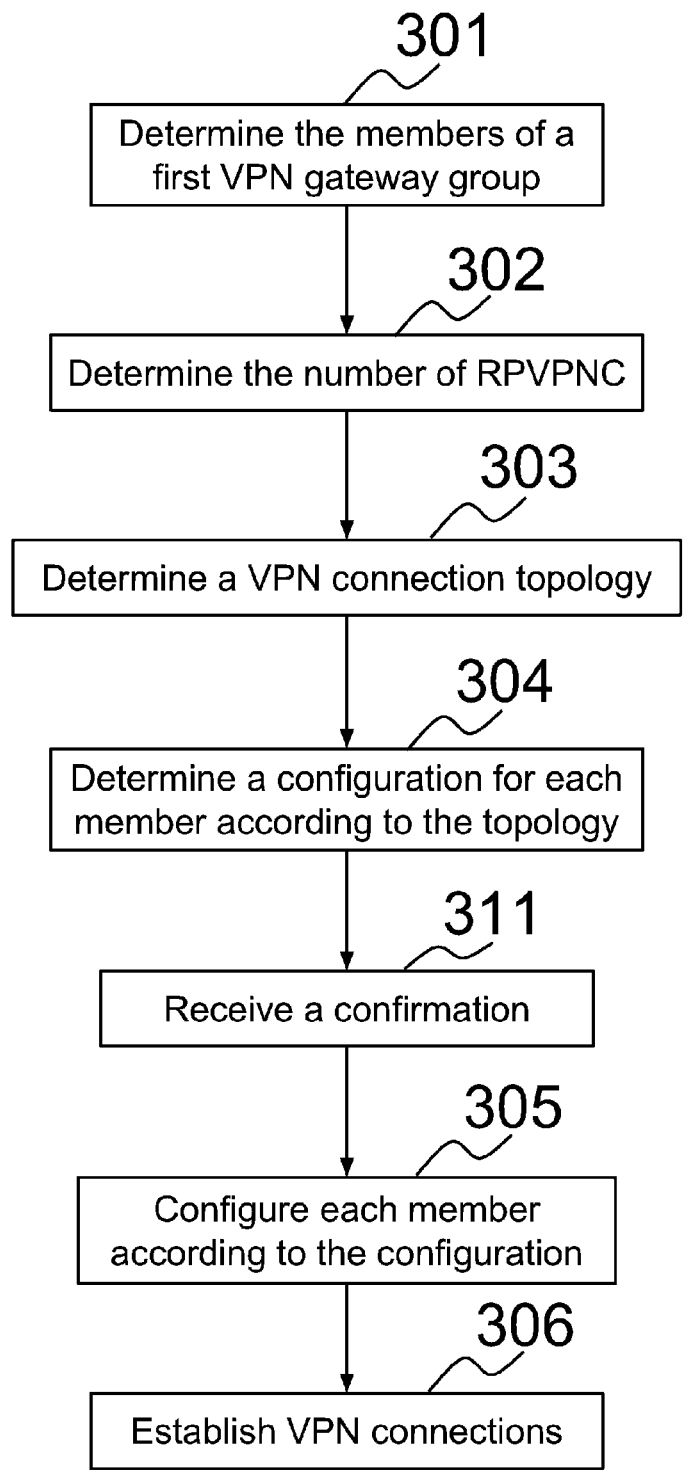
FIG. 3B is a flowchart illustrating process of one of the embodiments of the present invention.
Figure 3C:
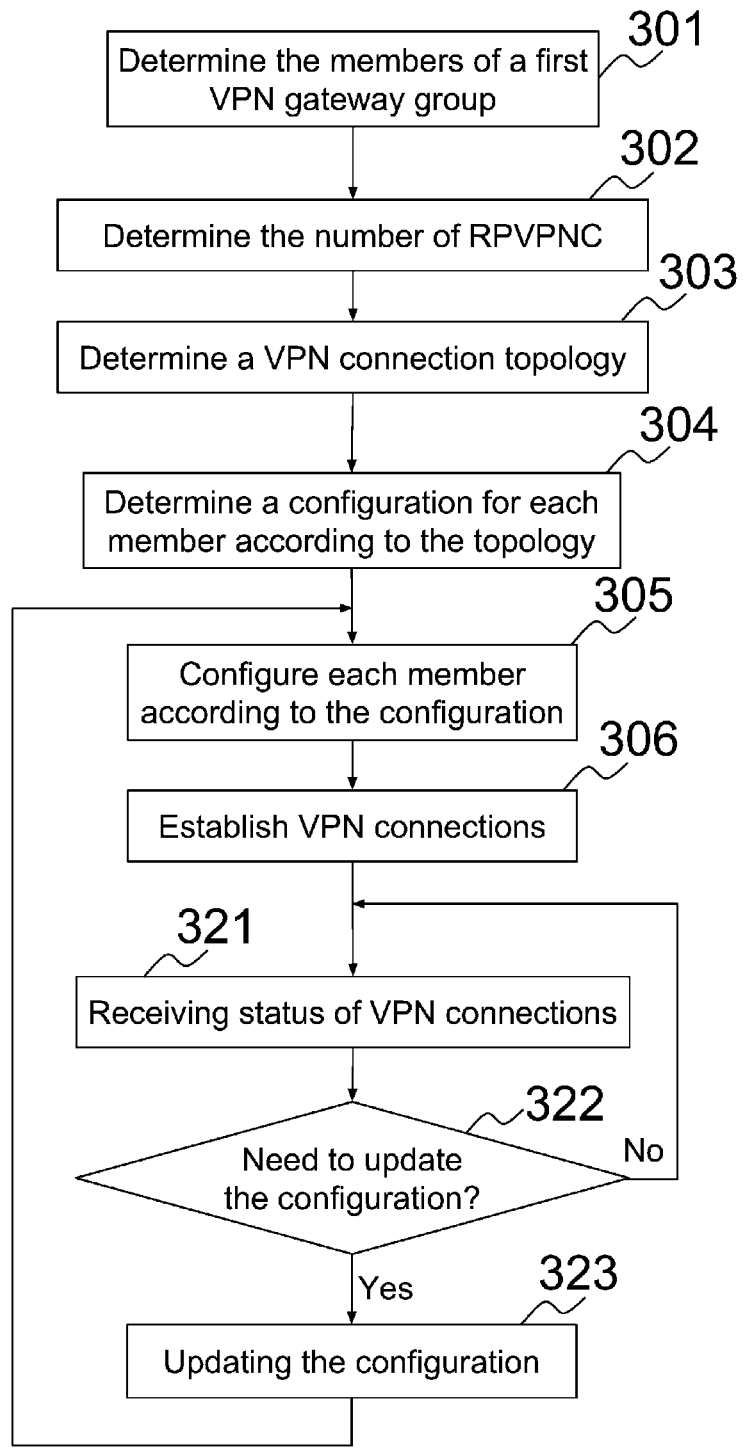
FIG. 3C is a flowchart illustrating process of one of the embodiments of the present invention.
Figure 4:
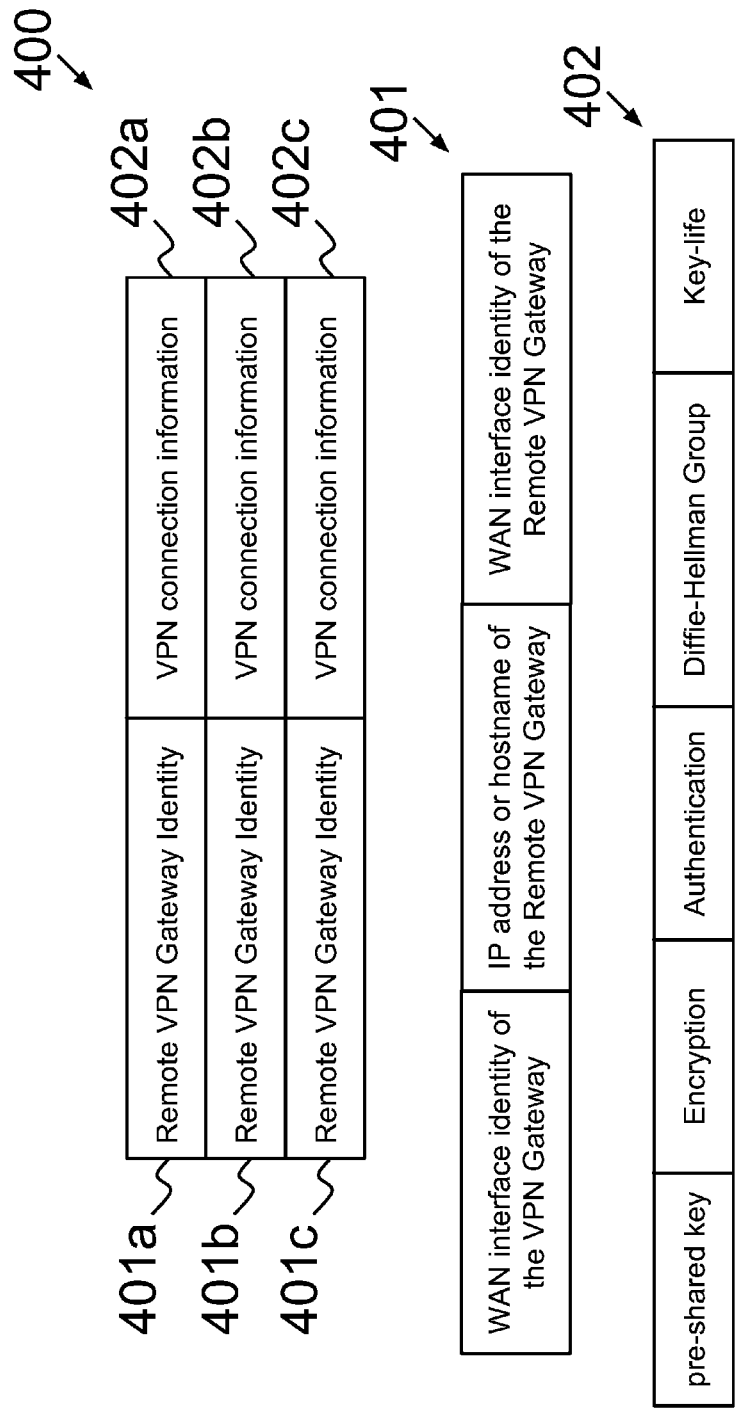
FIG. 4 illustrates a configuration according to one of the embodiments of the present invention.
Figure 5:
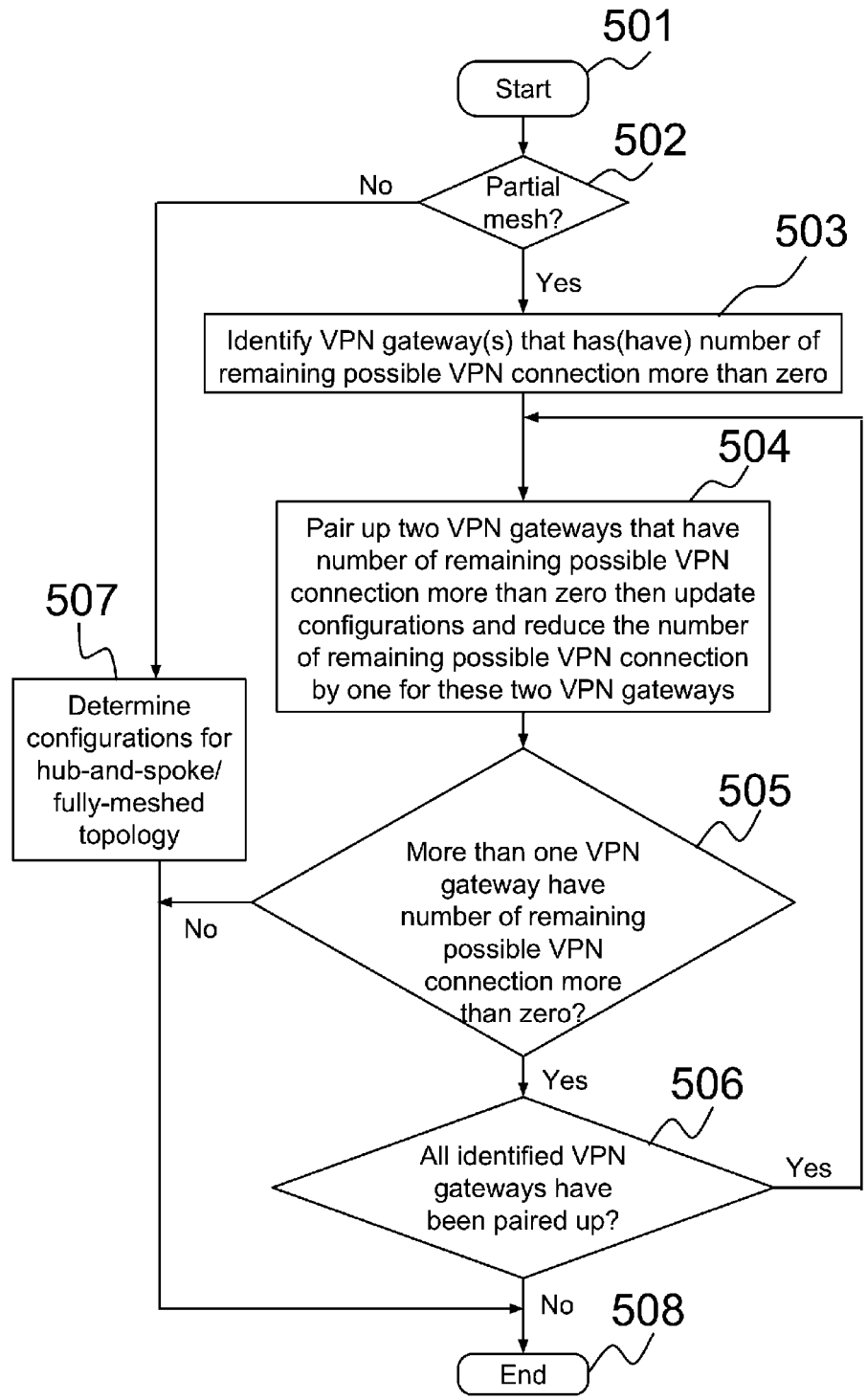
FIG. 5 illustrates the process to determine configurations according to one of the embodiments of the present invention.
Figure 6:
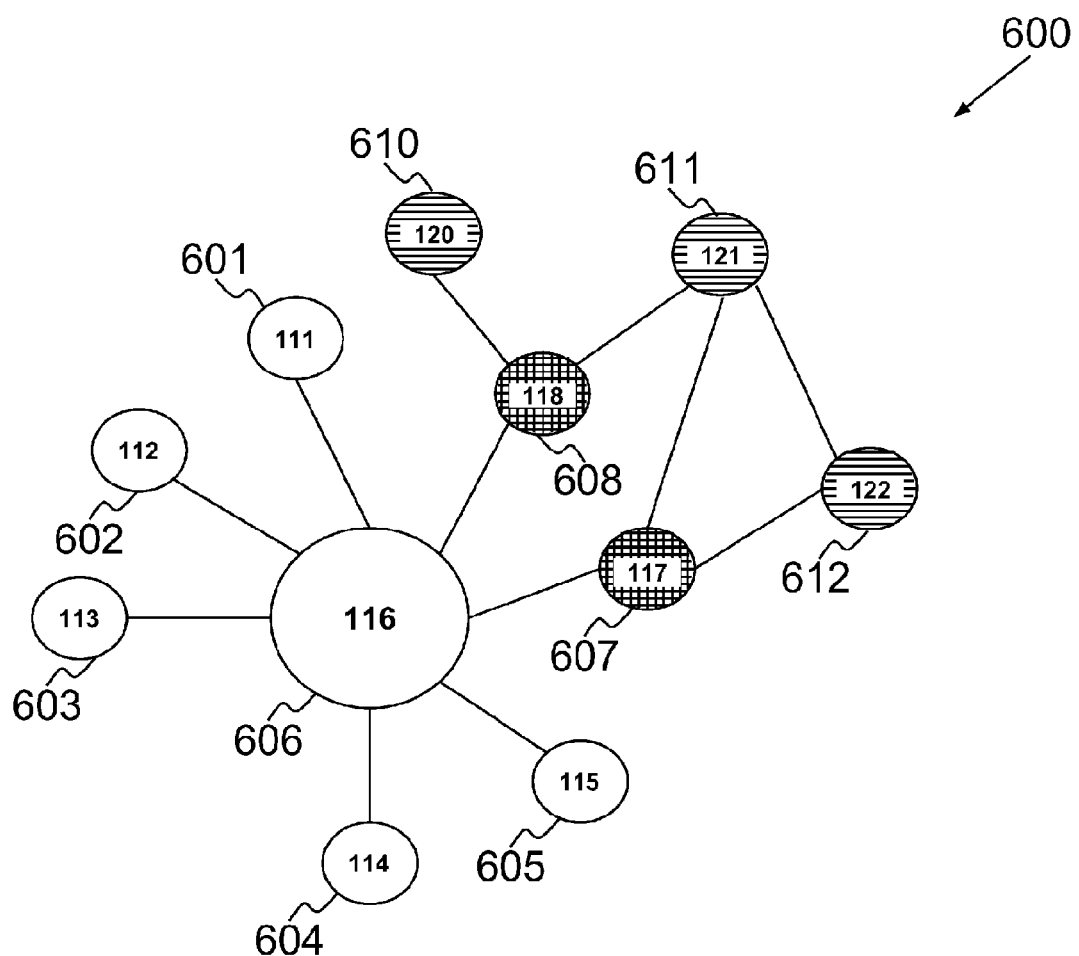
FIG. 6 is a user interface illustrating how VPN gateways are connected to each other according to one of the embodiments of the present invention.
Figure 7:
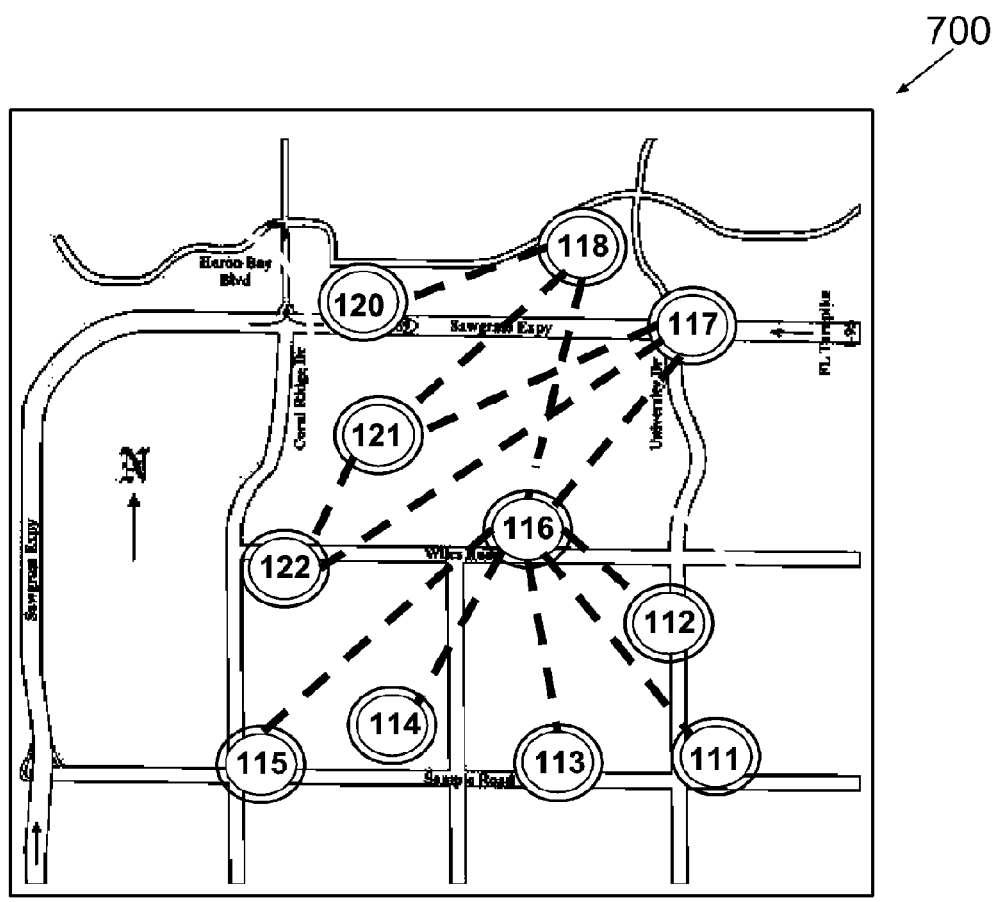
FIG. 7 is a user interface illustrating geographical locations of VPN gateways in a map, and how the VPN gateways are connected to each other according to one of the embodiments of the present invention.

The invention claimed is:

1. A method for establishing virtual private network (VPN) connections among a plurality of VPN gateways at a VPN management server, comprising the steps of:
    (a) determining VPN gateways belonging to a first VPN gateway group; wherein a member list of the first VPN gateway group is retrieved from a database, or a remote server;
    (b) determining number of possible VPN connections for each VPN gateway of the first VPN gateway group;
    (c) determining a configuration for each VPN gateway of the first VPN gateway group based on, at least in part, a VPN connection topology, the number of VPN connection license(s) and number of VPN connection license(s) already deployed by each VPN gateway; wherein information of the number of VPN connection license(s) of is retrieved from a license repository;
    (d) when the VPN connection topology is a hub-and-spoke topology:
        (i) determining an identity of a VPN gateway that serves as a hub;
        (ii) configuring each VPN gateway of the first VPN gateway group according to the configuration;
    (e) when the VPN connection topology is a partial-mesh topology:
        (i) determining identities of VPN gateways that have a remaining possible VPN connection of more than zero;
        (ii) pairing two VPN gateways that have number of remaining possible VPN connection (RPVPNC) more than zero;
        (iii) updating configurations and reducing the number of RPVPNC by one for the two VPN gateways;
        (iv) performing step (e)(iii) until all VPN gateways with RPVPNC more than zero have been paired up;
    (f) when the VPN connection topology is a full-mesh topology: configuring each VPN gateway of the first VPN gateway group to establish VPN connections with all other VPN gateways in the first VPN gateway group;
    (g) establishing a plurality of VPN connections based on, at least in part, the configurations;
    wherein the configuration is shown on a map; and wherein the map displays geographical locations of each VPN gateway and VPN connections established between VPN gateways of the first VPN gateway group.

2. According to the method of claim 1, further comprising: receiving a confirmation;
    wherein the step of configuring is performed only if the confirmation is received.

3. According to the method of claim 1, wherein the VPN connection topology is chosen from a group consisting of: hub-and-spoke topology, full-mesh topology, and partial-mesh topology.

4. According to the method of claim 1, wherein the VPN management server is hosted at a remote server or one of the VPN gateways, wherein the remote server is accessible through interconnected networks.

5. According to the method of claim, wherein the step of determining the configuration is further based on priority.

6. According to the method of claim 1, wherein one or more of the VPN connections is(are) aggregated VPN connection.

7. According to the method of claim 1, wherein the configuration is shown by a display.

8. According to the method of claim 1, wherein the VPN gateways are paired up sequentially.

9. According to the method of claim 1, further comprising:
    receiving status(es) of VPN connections from one or more of the VPN gateways;
    updating the configuration; and
    reconfiguring the one or more of the VPN gateway according to the status(es).

10. According to the method of claim 1, wherein the configuration includes: one or more of authentication information, encryption information and decryption information.

11. According to the method of claim 2, wherein the confirmation includes instruction to modify the configuration.

12. According to the method of claim 1, wherein the number of possible VPN connection(s) is based on, at least in part, number of VPN connection license(s).

13. A VPN management server capable of establishing VPN connections among a plurality of VPN gateways, comprising
    at least one network interface;
    at least one processing unit;
    at least one main memory;
    at least one secondary storage storing program instructions executable by the at least one processing unit for:
    (a) determining VPN gateways belonging to a first VPN gateway group; wherein a member list of the first VPN gateway group is retrieved from a database, or a remote server;
    (b) determining number of possible VPN connections for each VPN gateway of the first VPN gateway group;
    (c) determining a configuration for each VPN gateway of the first VPN gateway group based on, at least in part, a VPN connection topology, the number of VPN connection license(s) and number of VPN connection license(s) already deployed by each VPN gateway; wherein information of the number of VPN connection license(s) of is retrieved from a license repository;
    (d) when the VPN connection topology is a hub-and-spoke topology:
        (i) determining an identity of a VPN gateway that serves as a hub;
        (ii) configuring each VPN gateway of the first VPN gateway group according to the configuration;
    (e) when the VPN connection topology is a partial-mesh topology:
        (i) determining identities of VPN gateways that have a remaining possible VPN connection of more than zero;
        (ii) pairing two VPN gateways that have number of remaining possible VPN connection (RPVPNC) more than zero;
        (iii) updating configurations and reducing the number of RPVPNC by one for the two VPN gateways;

(iv) performing step (e)(iii) until all VPN gateways with RPVPNC more than zero have been paired up;

(f) when the VPN connection topology is a full-mesh topology: configuring each VPN gateway of the first VPN gateway group to establish VPN connections with all other VPN gateways in the first VPN gateway group;

(g) establishing a plurality of VPN connections based on, at least in part, the configurations;

wherein the configuration shown on a map; and wherein the map displays geographical locations of each VPN gateway and VPN connections established between VPN gateways of the first VPN gateway group.

14. The VPN management server of claim 13, wherein the at least one secondary storage further storing program instructions executable by the at least one processing unit for:
receiving a confirmation;
wherein the step of configuring is performed only if the confirmation is received.

15. The VPN management server of claim 13, wherein the VPN connection topology is chosen from a group consisting of: hub-and-spoke topology, full-mesh topology, and partial-mesh topology.

16. The VPN management server of claim 13, wherein the VPN management server is hosted at a remote server or one of the VPN gateways, wherein the remote server is accessible through interconnected networks.

17. The VPN management server of claim 13, wherein the step of determining the configuration is further based on the priority.

18. The VPN management server of claim 13, wherein one or more of the VPN connections is(are) aggregated VPN connection.

19. The VPN management server of claim 11, wherein the configuration is shown by a display.

20. The VPN management server of claim 13, wherein the VPN gateways are paired up sequentially.

21. The VPN management server of claim 13, further comprising:
receiving status(es) of VPN connections from one or more of the VPN gateways:
updating the configuration; and
reconfiguring the one or more of the VPN gateway according to the status(es).

22. The VPN management server of claim 13, wherein the configuration includes:
one or more of authentication information, encryption information and decryption information.

23. The VPN management server of claim 14, wherein the confirmation includes instruction to modify the configuration.

24. The VPN management server of claim 13, wherein the number of possible VPN connection(s) is based on, at least in part, number of VPN connection license(s).

* * * * *